United States Patent [19]
Kimura et al.

[11] Patent Number: 5,655,076
[45] Date of Patent: Aug. 5, 1997

[54] I/O INTERFACE CONTROL METHOD AND DATA PROCESSING EQUIPMENT WHICH COMPLETES I/O OPERATION IN EXECUTION WHEN ABNORMAL STATE OCCURS

[75] Inventors: Takemi Kimura; Masahiro Hatta; Hiroyuki Egawa; Akira Takakusagi, all of Kawasaki, Japan

[73] Assignee: Fujitsu Limited, Kawasaki, Japan

[21] Appl. No.: 330,023

[22] Filed: Oct. 27, 1994

[30] Foreign Application Priority Data

Jan. 25, 1994 [JP] Japan .................................. 6-006157

[51] Int. Cl.$^6$ ..................................................... G06F 11/22
[52] U.S. Cl. ................... 395/185.09; 395/183.19; 395/183.1; 395/185.01; 395/550; 395/185.04
[58] Field of Search ......................... 395/182.04, 182.06, 395/183.1, 185.09, 185.04, 849, 845, 869, 439, 182.02, 183.19, 856, 734, 735, 739, 182.03, 182.01, 182.22, 185.01, 550

[56] References Cited

U.S. PATENT DOCUMENTS

| | | | |
|---|---|---|---|
| 5,339,436 | 8/1994 | Tairaku et al. | 395/600 |
| 5,369,569 | 11/1994 | Maeda et al. | 364/184 |
| 5,423,025 | 6/1995 | Golman et al. | 395/185.1 |

*Primary Examiner*—Glenn A. Auve
*Assistant Examiner*—Ario Etienne
*Attorney, Agent, or Firm*—Staas and Halsey

[57] ABSTRACT

An I/O interface control method and data processing equipment each of which can avoid data destruction in an I/O unit even when a channel control unit is in a check/stop state. When an abnormal state notification signal from the channel control unit has been received, the channel element completes an I/O operation in execution to halt a transmission to a new I/O operation. When the abnormal state notification signal delayed by a predetermined time has been received, the main storage control unit separates the channel control unit from the channel element to halt the data transmission. The present invention can be applicable to computer systems each including a DASD acting as an I/O unit.

10 Claims, 7 Drawing Sheets

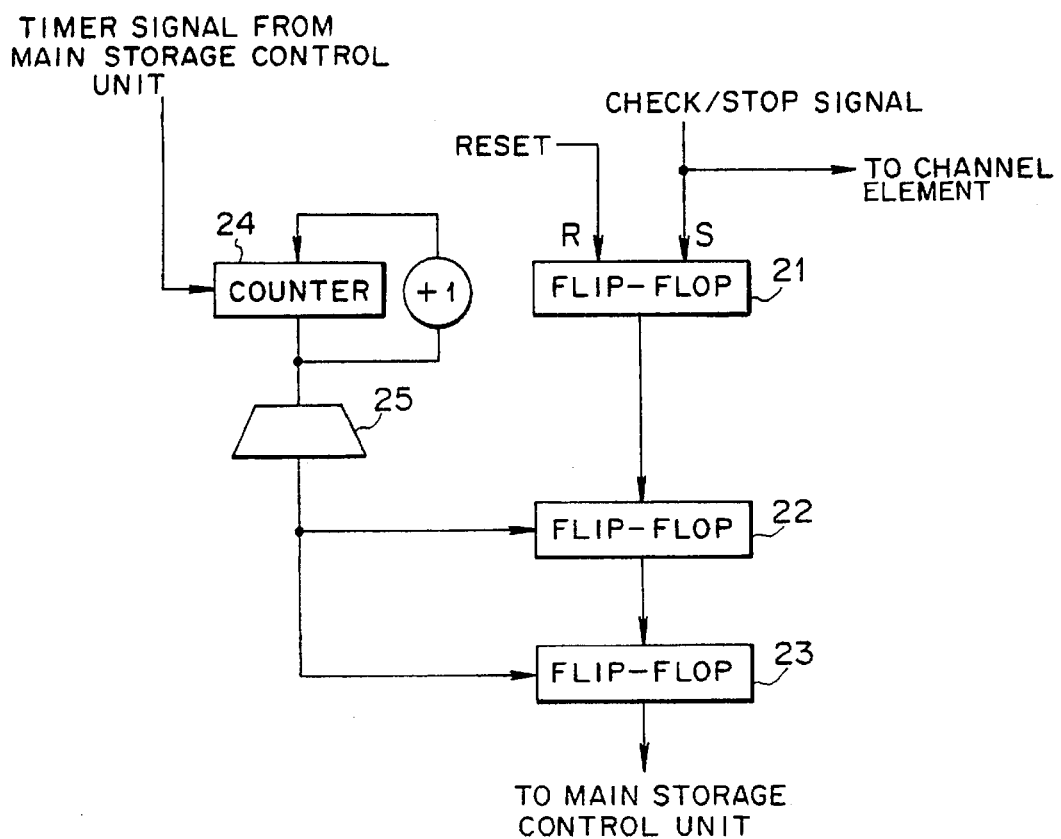
FIG. 2
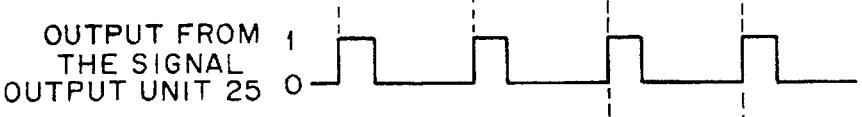
FIG. 3A  TIMER SIGNAL
FIG. 3B  OUTPUT FROM THE SIGNAL OUTPUT UNIT 25
FIG. 3C  OUTPUT FROM THE FLIP-FLOP 21
FIG. 3D  OUTPUT FROM THE FLIP-FLOP 22
FIG. 3E  OUTPUT FROM THE FLIP-FLOP 23

I/O INTERFACE CONTROL METHOD AND DATA PROCESSING EQUIPMENT WHICH COMPLETES I/O OPERATION IN EXECUTION WHEN ABNORMAL STATE OCCURS

BACKGROUND OF THE INVENTION

1) Field of the Invention

The present invention relates to an I/O interface control suitable for data processing equipment that constitutes a computing system and that is connected to an I/O unit such as a direct access storage device (DASD). Specifically, the present invention relates to an I/O interface control method that can deal more effectively with an abnormal state (check/ stop) in a channel control unit arranged within data processing equipment to be connected to an I/O unit. The present invention also relates to data processing equipment that can deal more effectively with an abnormal state (check/stop) in a channel control device arranged within the data processing equipment to be connected to an I/O unit.

2) Description of the Related Art

The general entire configuration of data processing equipment at which an I/O unit such as a DASD is connected is shown in FIG. 7. Referring to FIG. 7, the data processing equipment 1 includes a central processing unit (CPU) 10, a main storage unit (MSU) 11, a main storage control unit (MCU) 12, an input/output processor (IOP) 13, and a channel element (CHE) 14.

Plural I/O units 15 such as DASDs are connected to the data processing equipment 1 via the I/O control unit 16, respectively. As shown in FIG. 7, plural I/O control units 16 are connected to the plural I/O units 15, respectively.

The CPU 10 executes various processes based on data stored in the main storage unit 11. The main storage control unit 12 controls data flow between the main storage unit 11 and the CPU 10.

The I/O processor 13 is connected to the main storage unit 11 via the main storage control unit 12 to control a data flow between the I/O unit 15 such as a DASD acting as peripheral equipment and the main storage unit 11 by way of the channel element 14 and the I/O control unit 16.

As shown in FIG. 8, the I/O processor 13 is formed of the channel control unit 13A and the transfer control unit 13B.

The channel control unit 13A controls respective channel elements 14. The transfer control unit 13B controls data to be transferred between the main storage control unit 12 and the respective I/O unit 15.

Each channel element 14 acts as a functional unit that performs a data transmission between the main storage control unit 12 and each I/O units 15. Each channel element 14 receives data from the main storage unit 12 to be transferred by the transfer control unit 13B to a specific I/O unit 15 via the I/O control unit 16.

In FIG. 8, the CPU 10, the main storage unit 11, and the I/O control unit 16 are not illustrated, but one channel element 14 as well as one I/O unit 15 are illustrated. As shown in FIG. 8, the channel element 13A includes a check/stop signal producing circuit 17 (to be described later).

Generally, the word "check/stop" means that when an emergent serious trouble occurs in the data processing equipment shown in FIGS. 7 and 8, the related circuitry at the accidental spot is halted.

For example, when the channel control unit 13A in the data processing equipment 1 becomes a check/stop state due to a hardware failure, the I/O interface cannot continue its sequence operation so that the I/O unit 15 is hanged up. As a result, the trouble may affect the operation of other data equipment sharing the I/O unit 14. Hence, if a check/stop should occur in the channel control unit 13A, the I/O interface should be released quickly.

In the conventional data processing equipment, shown in FIG. 8, the channel control unit 13A includes the check/stop signal producing circuit 17. When the channel control unit 13A becomes a check/stop state, the check/stop signal producing circuit 17 outputs a check/stop signal to the main storage control unit 12 and the channel element 14 to notify them of the abnormal state of the channel control unit 13A.

When the channel element 14 receives the check/stop signal from the check/stop signal producing circuit 17, it outputs immediately a selective reset signal, thus releasing the I/O interface from the I/O unit 15.

The main storage unit 12 receives a check/stop signal from the check/stop signal producing circuit 17, it separates quickly the channel control unit 13A while it interrupts the data transfer during a data transmission (or performs interface cutting process) since the main storage unit is released under software.

As described above, according to the prior art, when it receives a check/stop signal informing an abnormal state of the channel control unit 13A, the channel element 14 issues immediately the selective reset signal to release the I/O interface. Hence when the check/stop occurs during a data writing to the I/O unit 15 such as a DASD, the block (or record) during the writing operation, as shown in FIG. 9, is padded zero after the check/stop occurrence, whereby an improper data block is written to the I/O unit 15.

Similarly, since the main storage control unit 12 separates immediately the channel control unit 13A in response to the check/stop signal from the channel control unit 13A and interrupts the data transmission, even if the channel element 14 does not issue the selective reset signal, the transfer operation results in an overrun of data or zero-padding is carried out to the block during a writing operation. It has been very difficult to recover the software if there should be a block which is zero-padded or broken.

SUMMARY OF THE INVENTION

The present invention is made to overcome the above mentioned problems. An object of the present invention is to provide an I/O interface control method by which the I/O operation in execution can be completed without interrupting the operation when a check/stop has occurred in a channel control unit during a data transmission.

Another object of the present invention is to provide data processing equipment that can be completed without interrupting the operation when a check/stop has occurred in a channel control unit during a data transmission.

In order to achieve the above objects, according to the present invention, the I/O interface control method is characterized by the steps of transmitting an abnormal state notification signal for notifying an abnormal state occurrence to a channel element when a channel control unit detects the abnormal state, and then delaying the abnormal state notification signal by a predetermined time to transmit the outcome to the main storage control unit; completing an I/O operation in execution to halt a transition to a new I/O operation when the channel element has received the abnormal state notification signal; and separating the channel control unit from the channel element to interrupt a data transmission when the main storage control unit has received the abnormal state notification signal delayed by the predetermined time.

Moreover, according to the present invention, the data processing equipment is characterized in that the channel control unit includes an abnormal state notification signal producing circuit for producing an abnormal state notification signal to notify an occurrence of an abnormal state when the channel control unit detects an abnormal state, to transmit it to the channel element, and a delay circuit for delaying the abnormal state notification signal by a predetermined time to transmit the outcome to the main storage control unit; and that the channel element includes a first control unit for completing an I/O operation in execution when the abnormal state notification signal has been received, to halt a transition to a new I/O operation; and that the main storage control unit includes a second control unit for separating the channel control unit and the channel unit when the abnormal state notification signal delayed by a predetermined period has been received, to interrupt the data transmission.

As described above, according to the I/O interface control method and the data processing equipment of the present invention, the I/O operation in execution can be completed without interrupting the operation when a check/stop has occurred in a channel control unit during a data transmission, and can avoid certainly the breakage of a data block in the input/output processor as well as the difficult recovery work due to software.

BRIEF DESCRIPTION OF THE DRAWINGS

FIG. 2 is a block diagram showing the configuration of a delay circuit according to the present embodiment;

FIGS. 3A, 3B, 3C, 3D and 3E are time charts used for explaining the operation of a delay circuit according to the present embodiment;

DESCRIPTION OF THE PREFERRED EMBODIMENTS

Referring to the attached drawings, explanation will be made in detail as for a preferred embodiment according to the present invention.

Figure 1:
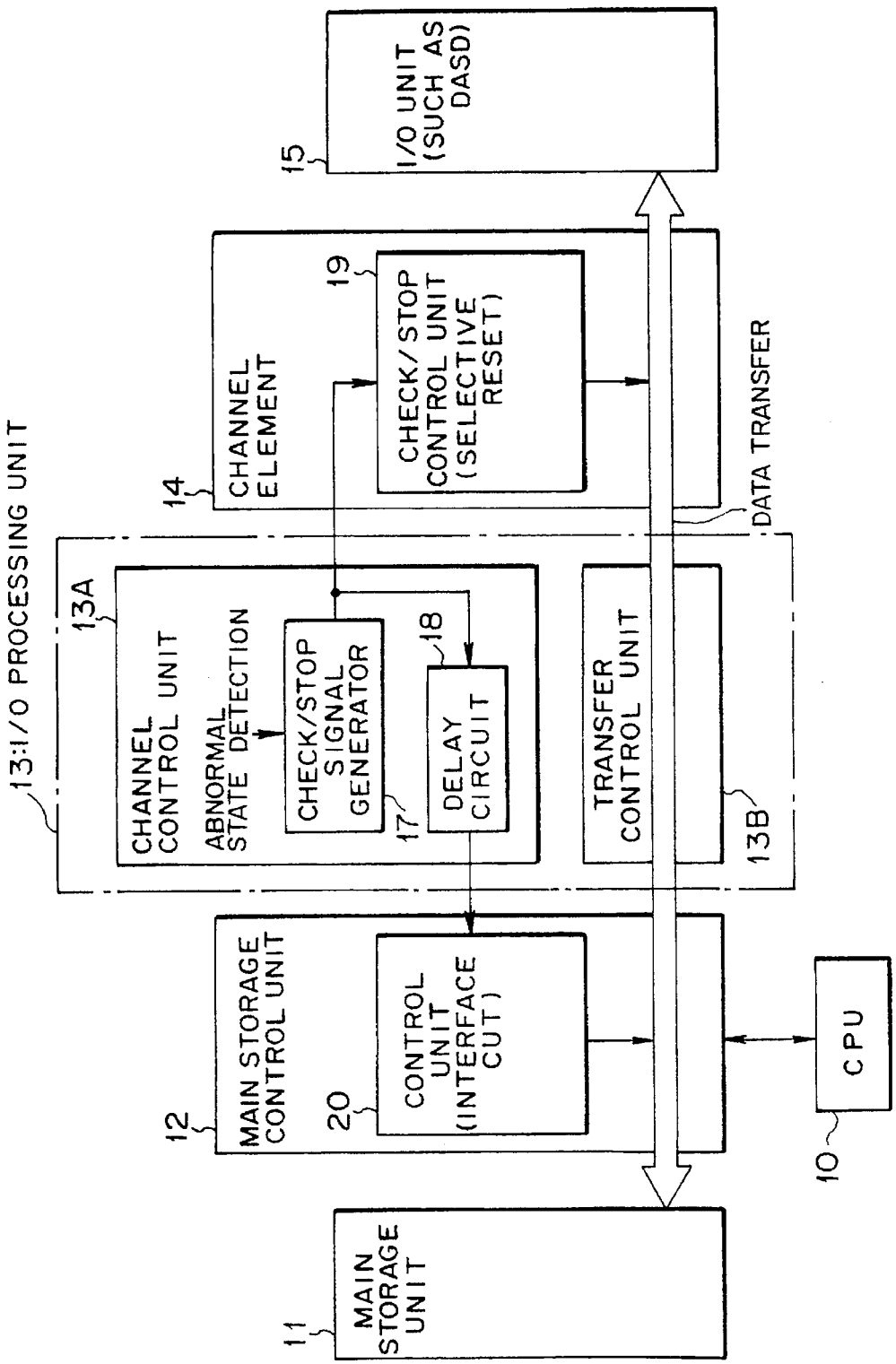
FIG. 1 is a block diagram showing the configuration of data processing equipment according to the first embodiment of the present invention.
Figure 7:
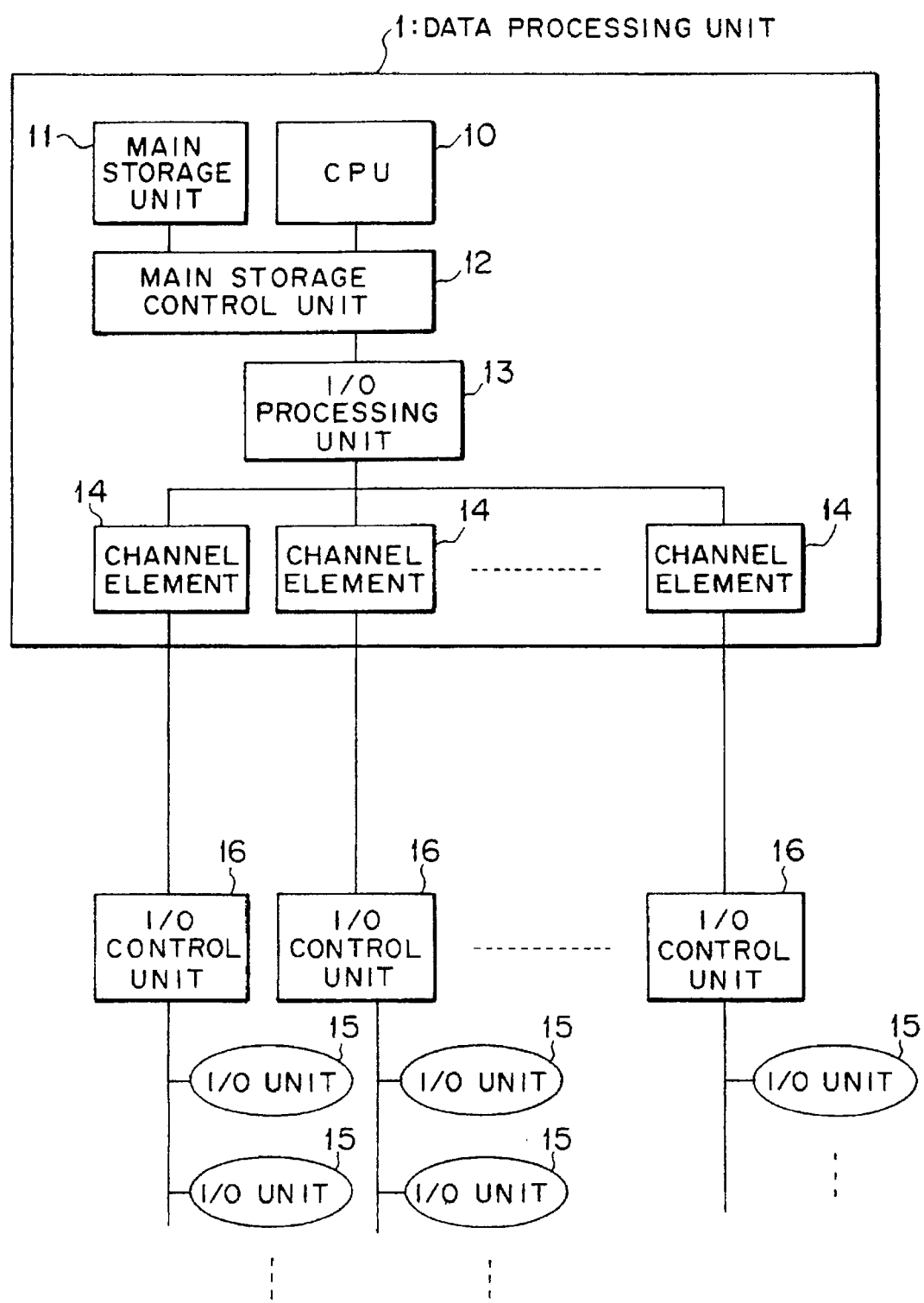
FIG. 7 is a block diagram showing the general entire configuration of the data processing unit connected to the input/output device.
Figure 8:
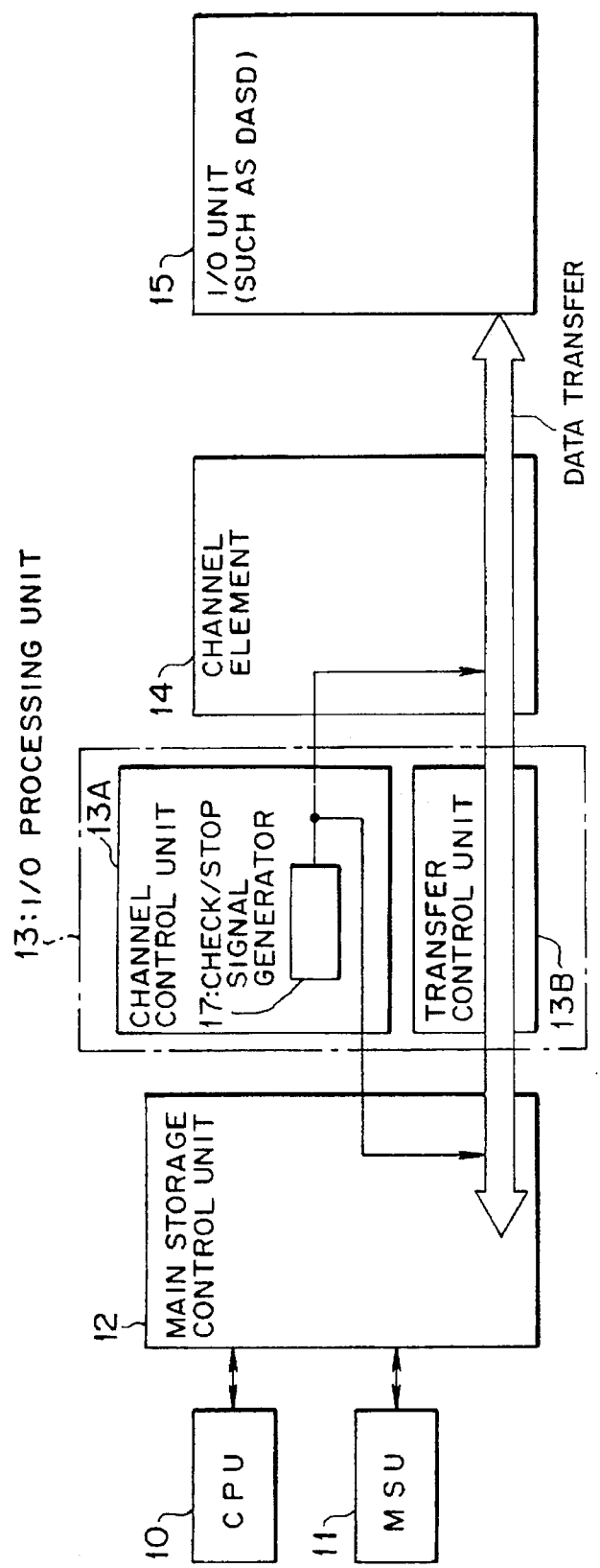
FIG. 8 is a block diagram showing the main configuration of conventional data processing equipment.
Figure 9:
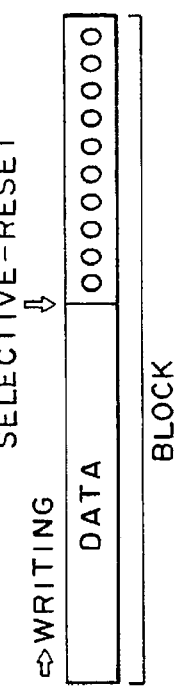
FIG. 9 is a block diagram showing an example where a zero-padding has occurred.

The data processing equipment shown in FIG. 1 has the general entire configuration shown in FIG. 7. Referring to FIG. 1, like numerals are attached to like elements shown in FIG. 7. Hence the detailed explanation will be omitted here. FIG. 1 show one channel unit 14 and one I/O unit 15, but does not show the I/O control unit 16.

In the data processing equipment shown in FIG. 1, the channel element 14 is connected to the external I/O unit 15 such as a DASD to execute the data transmission between the main storage unit 11 and the I/O unit 15. The channel control unit 13A controls plural channel elements 14. The transfer control unit 13B is connected to the main storage control unit 12 and the channel element 14 to control the data flow between them. The main storage control unit 12 is connected to the main storage unit 11, the CPU 10, and the I/O processor 13 to control the data flow from/to the main storage unit 11.

According to the present embodiment, the channel control unit 13A includes the check/stop signal producing circuit (or the abnormal state notification signal producing circuit) 17 and the delay circuit 18.

When the channel control unit 13A detects an abnormal state, the check/stop signal producing circuit 17 transmits check/stop signal (abnormal state notification signal) to notify the channel element 14 of the abnormal state.

The delay circuit 18, as shown in FIG. 1, delays the check/stop signal from the check/stop signal producing circuit 17 by a predetermined period of time to transmit the outcome to the main storage control unit 12. The delay time of the delay circuit 18 is set to at least a value at which the one channel command to the I/O unit 15 ends.

On the other hand, according to the present embodiment, each channel element 14 includes a check/stop control unit (first control unit) 19. The check/stop control unit 19 completes the I/O operation in execution at the time the check/stop signal from the channel control unit 13A has been received and then controls to block a transition to the next I/O operation.

Figure 4:
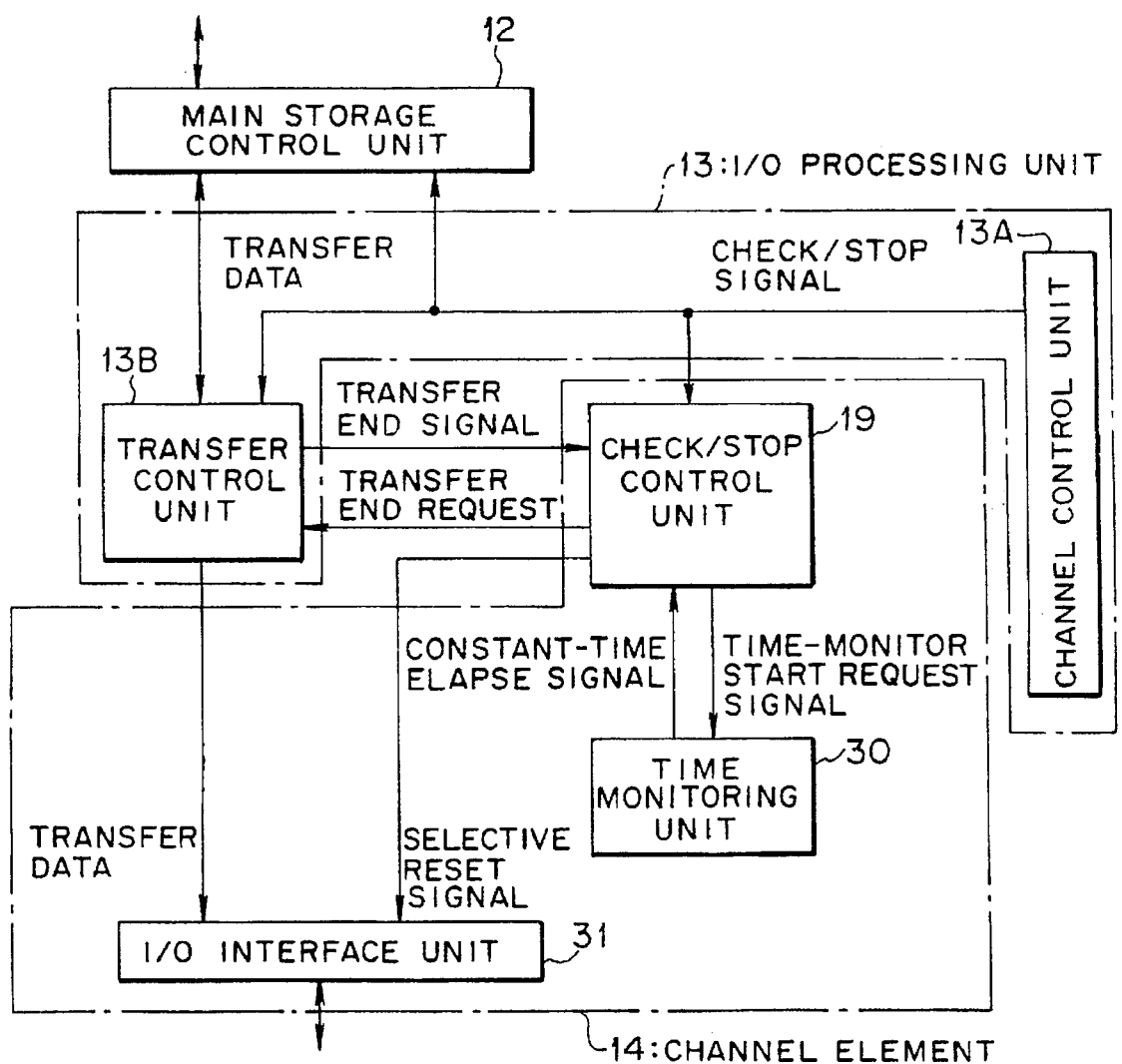
FIG. 4 is a block diagram showing the configuration of a check/stop control unit in the channel element according to the present embodiment.

In the present embodiment, as shown in FIG. 4, each channel element 14 includes a time monitoring unit 30 that monitors the I/O operation time in execution at the time the check/stop signal has been received. When the data transmission has not been completed under the I/O operation in execution after a lapse of the monitoring time of the time monitoring unit 30, the check/stop control unit 19 interrupts the I/O operation to release the I/O interface.

The monitoring time of the time monitoring unit 30 is set to at least the time during which one channel command to the I/O unit 15 is completed. The detail configuration and the operation of the check/stop control unit 19 and the time monitoring unit 30 will be explained later with reference to FIGS. 4 and 5.

Moreover, the main storage control unit 12 according to the present embodiment includes the control unit (second control unit) 20. When receiving a check/stop signal delayed by a predetermined period of time from the channel control unit 13A, the control unit 20 separates the channel control unit 13A and each channel element 14 to interrupt the data transmission.

The entire operation of the data processing equipment according to the present embodiment will be explained briefly with reference to FIG. 1. The I/O unit 15 acting as a DASD will be explained here. However, the I/O unit 15 should not be limited only to the DASD.

When the check/stop control unit 19 in the channel element 14 receives a check/stop signal from the channel control unit (check/stop signal producing circuit 17) 13, it continues the data transmission in execution without producing immediately a selective reset signal. After the completion of the data transmission, the check/stop control unit 19 blocks the transition to the next I/O operation, but produces the selective reset signal to release the I/O interface.

When the channel control unit 13A is in a check/stop state, continuing the data transmission for a long time may cause the data corruption because software releases the main storage region after a certain period. In the present embodiment, the delay circuit 18 in the channel control unit 13A delays the signal (check/stop signal) transmitted to the main storage control unit 12 to separate the channel control unit 13A by a fixed time (as time as one command to the DASD is completed). When the I/O operation in execution has not completed the data transmission after a lapse of the fixed period of time, the control unit 20 in the main storage control unit 12 separates the channel control unit 13A to interrupt the data transmission.

If the channel element 14 does not complete the I/O operation after a fixed period of time (as time as one command to the DASD is completed), the main storage control unit 12 interrupts the data transmission so that the data transmission on the side of the channel element 14 may be hung. In such a case, the channel element 14 remains holding the I/O interface. Hence, when the time monitoring unit 30 monitors the data transmission time exceeding a fixed time (as time as one command to the DASD is completed), the check/stop control unit 19 halts the I/O operation in execution to produce the selective reset signal.

As described above, even if the channel control unit 13A becomes a check/stop state during a writing operation to the DASD (I/O unit 15), a writing in block unit to the DASD can be completed without interrupting the I/O operation in execution. As a result, the block destruction in the DASD can be certainly avoided and the difficult recovery work due to software can be avoided.

Next, the configuration and operation of the delay circuit 18 of the present embodiment will be explained in detail with reference to FIGS. 2 and 3A–E. The delay circuit 18, as shown in FIG. 2, is formed of the flip-flops 21, 22, and 23, the counter 24, and the signal output unit 25.

The flip-flop 21 holds a check/stop signal from the check/stop signal producing circuit 17 shown in FIG. 1. When the flip-flop 21 holds once the check/stop signal, it holds its output "1" till a reset signal such as a system reset is input. In response to the signal from the signal output unit 25 (to be described later), the flip-flop 22 holds the output from the flip-flop 21 while the flip-flop 23 holds the output from the flip-flop 22.

The counter 24 increments in response to a timer signal (clock signal) from the main storage control unit 12. When the counter 24 counts its predetermined count value, the signal output unit 25 outputs a signal to hold the flip-flops 22 and 23, thus outputting signals at predetermined time intervals in accordance with the count value, as described later in FIGS. 3A–E.

When the delay circuit 18, for example, as shown in FIGS. 3A–E, receives a timer signal from the main storage unit 12, the counter 24 is incremented. When the counter 24 counts a predetermined count value (for example, an even or odd number in FIGS. 3A–E), the signal output unit 25 outputs a signal of "1". That is, the signal output unit 25 sets up "1" at suitable time intervals τ.

The flip-flops 22 and 23 performs a holding operation in response to a signal from the signal output 25. With no check/stop signal held in the flip-flop 21 and an output of "0" from the flip-flop 21, the flip-flops 22 and 23 remain the outputs of "0".

When a check/stop signal from the check/stop signal producing circuit 17 is set to the flip-flop 21 at, for example, the timing T1 shown in FIGS. 3A–E, the flip-flop 21 sets up immediately the output of "1".

Thereafter, at the timing T2 at which the signal from the signal output unit 25 sets up at first to "1", the flip-flop 22 receives the outputs from the flip-flop 21 and sets up the output to "1". At this time, the output of the flip-flop 23 remains still "0".

At the timing T3 at which the signal output unit 25 sets next up the output to "1", the flip-flop 23 receives the output from the flip-flop 22 and then sets up the output to "1". The resultant output is sent to the control unit 20 in the main storage control unit 12.

According to the present embodiment, the delay circuit 18 delays the check/stop signal from the check/stop signal producing circuit 17 by (α+τ), where α is the interval between signals from the signal output unit 25 and τ is the period taken from the time the check/stop signal has occurred to the time the signal output unit 25 has first outputted a signal, and then transmits the outcome to the main storage control unit 12.

Clock signals from a certain means, instead of the timer signal from the main storage control unit 12, may be used as the count clock from the counter 24. The output intervals of signals from the signal output unit 25 should not be limited only to the example shown in FIGS. 3A–E.

In the case where the DASD is used as the I/O unit 15, the delay time of the check/stop signal from the delay circuit 18 is set, for example, to the following value. The command execution to the DASD is usually carried out every block unit. Hence, the execution time per command can be determined as "execution time=(block length/transfer rate)". For example, if the block length is maximum (corresponding to the truck length) and the transfer rate is 3 Mbps, the execution time is 47 KB/3 Mbps, or about 15.7 ms. Hence, it is desirable that the delay circuit 18 delays the delay time of the check/stop signal by about (15.7+α) ms, where α is a value 15.7 or less. That is, in the example shown in FIGS. 3A–E, the interval τ between signals from the signal output unit 25 is set to 15.7 ms.

Figure 5:
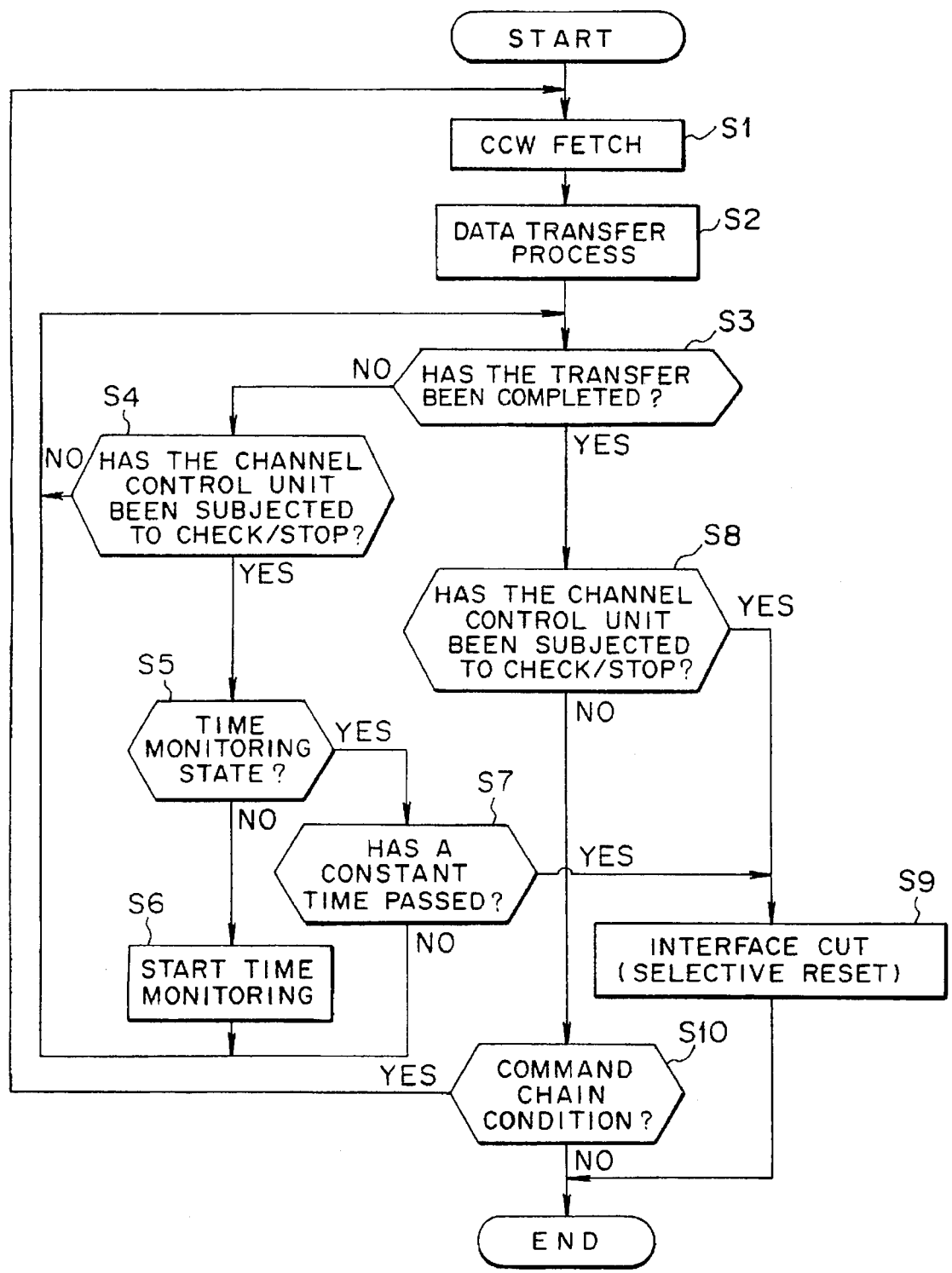
FIG. 5 is a flowchart used for explaining the operation of the check/stop control unit in the channel element according to the present embodiment.

Next, detail explanation will be made below as for the configuration and operation of the channel element 14 according to the present embodiment with reference to FIGS. 4 and 5. Referring to FIG. 4, the channel element 14 includes the check/stop control unit 19 (described with FIG. 1), the time monitoring unit 30, and the I/O interface unit 31.

The check/stop control unit 19 completes continuously the current I/O operation in execution till it receives a transfer completion signal from the transfer control unit 13B to complete the data transfer process in execution at the time the check/stop signal from the channel control unit 13A has been received. When the check/stop control unit 19 receives the transfer completion signal from the transfer control unit 13B, it produces the selective reset signal to the I/O interface unit 31, thus releasing the I/O interface and blocking the transition to the next I/O operation.

In response to the time-monitor starting request from the check/stop control unit 19 at a reception of the check/stop signal, the time monitoring unit 30 starts to monitor the time of the current I/O operation in execution. After a lapse of a fixed period of time, the time monitoring unit 30 transmits a signal corresponding to the elapsed time to the check/stop control unit 19.

When the check/stop control unit 19 has received the elapsed time representing signal from the time monitoring 30, provided that the transfer control unit 13B has not still received a transfer completion signal because of the I/O operation, the check/stop control unit 19 transmits the transfer completion signal to the transfer control unit 13B while it produces a selective reset signal to the I/0 interface unit 31 to interrupt the I/O operation in execution, thus releasing the I/O interface.

The operation of the check/stop control unit 19 in the channel circuit 14 will be explained below with reference to the flowchart (steps S1 to S10) shown in FIG. 5.

The check/stop control circuit 19 executes the following control under the channel command. First, the channel command word (CCW) is fetched (step S1). Then, a data transmission process is performed between the main storage unit 11 and the I/O unit 15, in accordance with the fetched CCW (step S2).

After the data transfer process starting, it is checked whether the data transfer has been completed or the transfer completion signal from the transfer control unit 13B has been received (step S3). If the data transfer has been completed, the flow goes to the step S8. If the data transfer has not been completed, it is checked whether there is a check/stop signal transmitted from the channel control unit 13A (step S4). If the check/stop signal has not been transmitted, the flow goes back to the step S3 to wait for the transfer completion.

On the other hand, when the channel control unit 13A transmits the check/stop signal, it is checked whether the time monitoring unit 30 is currently in a time monitoring state (step S5). If the time monitoring unit 30 is not in the time monitoring state, a time-monitor starting request is output to the time monitoring unit 30 to start the time-monitoring operation (step S6), and then the flow goes back to the step S3.

If it is decided that the time monitoring unit 30 is currently in a time monitoring state in the step S5, it is decided whether the time monitoring unit 30 has monitored for a fixed period, or the time monitoring unit 30 has received a fixed elapsed time representing signal (step S7). If the monitoring time has not exceeded the fixed period of time, the flow goes to the step S3, but if it has exceeded, the flow goes to the step S9.

If it is decided that the data transfer has completed in the step S3, it is decided whether the channel element 13A has transmitted the check/stop signal (step S8). If the check/stop signal has not been transmitted, the command chain condition for the CCW is checked (step S10) because the normal operation can be performed. When the CCW continues, the same control is repeated in the step S1. When processes for all CCWs have been completed, NO decision is issued in the step S10 so that the transfer control is completed.

If it is decided that a fixed period of time has passed in the monitoring operation in the step S7, or that the check/stop signal has been transmitted in the step S8 after a completion of the data transmission (YES decision in the step S3), the selective reset signal is input to the I/O interface unit 31 to cut the I/O interface (step S9). Thus the transfer control is completed. That is, the channel control unit 13A is separated from the transfer control unit 13B while the data transfer is interrupted.

Figure 6:
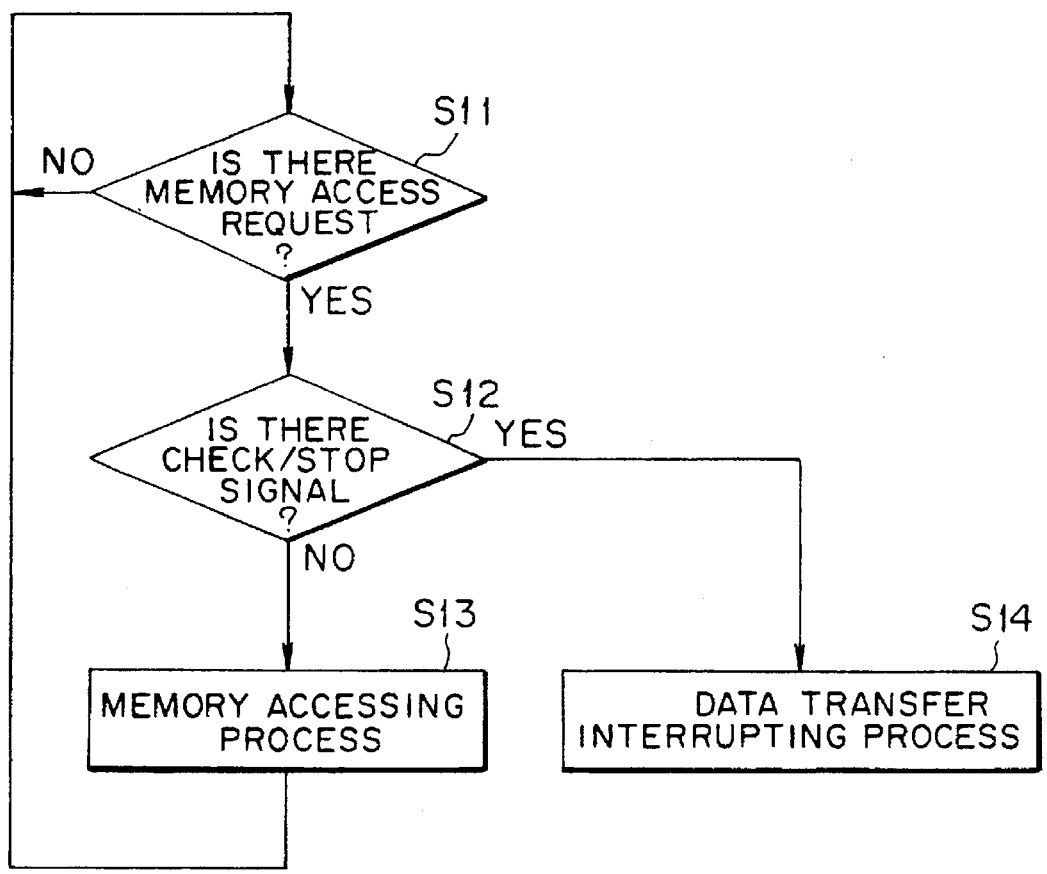
FIG. 6 is a flowchart used for explaining the operation of the control unit in the main storage control unit according to the present embodiment.

Next, the operation of the control unit 20 in the main storage control unit 12 according to the present embodiment will be explained with reference to the flow chart (steps S11 to S14) shown in FIG. 6. The control unit 20 waits for the memory access request from the transfer control unit 13B within the I/O processor 13 (step S11). In response to an memory access request from the transfer control unit 13B, it is checked whether the control unit 20 has received the check/stop signal (delayed by the delay circuit 18) from the channel control unit 13A (step S12).

If there is no check/stop signal received, the memory access is performed in response to the memory access request (step S13). If the check/stop signal has been received, the channel control unit 13A is immediately separated from each channel element 14 to interrupt the data transmission (step S14).

As described above, when the check/stop signal producing circuit 17 produces a check/stop signal due to an abnormal operation of the channel control unit 13A, the check/stop control unit 19 in the channel element 14 continues at that time the I/O operation in execution while it blocks the next I/O operation. After a lapse of a fixed period of time (as time as the one command to the DASD is completed), the I/O operation in execution is interrupted to release the I/O interface.

Furthermore, the delay circuit 18 delays the signal transmission to the main storage control unit 12 by a fixed period of time to cut the channel control unit 13A. After one command to the DASD has completely performed, the channel control unit 13A is subjected to a separating process.

What is claimed is:

1. An I/O interface control method suitable for data processing equipment, said data processing equipment including a main storage unit, plural channel elements each connected to an external I/O unit for performing a transfer of data between said I/O unit and said main storage unit, a channel control unit for controlling said plural channel elements, and a main storage control unit for controlling a flow of data from or to said main storage unit, comprising the steps of:

transmitting an abnormal state notification signal for notifying an abnormal state occurrence to said channel element when said channel control unit detects an abnormal state, then delaying said abnormal state notification signal by a predetermined time and transmitting said delayed abnormal state notification signal to said main storage control unit;

completing an I/O operation in execution when said channel element receives said abnormal state notification signal, to halt a transition to a new I/O operation; and separating said channel control unit from said channel element to interrupt a data transmission when said main storage control unit receives said abnormal state notification signal delayed by said predetermined time.

2. An I/O interface control method according to claim 1, further comprising the steps of:

time-monitoring the I/O operation in execution when said channel element has received said abnormal state notification signal; and interrupting the I/O operation in execution when the data transmission has not been completed due to said I/O operation after a lapse of a predetermined period, to release an I/O interface.

3. An I/O interface control method according to claim 1, further comprising the steps of:

setting the delayed time of said abnormal state notification signal to be transmitted to said main storage control unit, to at least a time needed to complete one channel command to said I/O unit.

4. An I/O interface control method according to claim 2, further comprising the steps of:

setting the delayed time of said abnormal state notification signal to be transmitted to said main storage control unit, to at least a time needed to complete one channel command to said I/O unit.

5. An I/O interface control method according to claim 2, further comprising the steps of:

setting an I/O operation time monitored by said channel element, to at least a time needed to complete one channel command to said I/O output unit.

6. Data processing equipment comprising a main storage unit, plural channel elements each connected to an external I/O unit for processing a transfer of data between an I/O unit and said main storage unit, a channel control unit for controlling said plural channel elements, and a main storage control unit for controlling a flow of data from or to said main storage unit, comprising:

an abnormal state notification signal producing circuit, in said channel control unit, to produce an abnormal state notification signal to notify an occurrence of an abnormal state when said channel control unit detects an abnormal state and to transmit said abnormal state notification signal to said channel element;

a delay circuit, in said channel control unit, to delay said abnormal state notification signal by a predetermined time and to transmit said delayed abnormal state notification signal to said main storage control unit;

each of said channel elements including a first control unit to complete an I/O operation in execution when said abnormal state notification signal has been received, to halt a transition to a new I/O operation;

said main storage control unit including a second control unit to separate said channel control unit from said channel element when said abnormal state notification signal delayed by a predetermined period has been received, to interrupt the data transmission.

7. Data processing equipment according to claim 6, wherein said channel element includes a time monitoring unit for time-monitoring said I/O operation in execution when said abnormal state notification signal has been received; said first control unit interrupting an I/O operation in execution to release an I/O interface when the data transmission is not completed after the monitoring time of said time monitoring unit has been passed.

8. Data processing equipment according to claim 6, wherein the delay time of said delay circuit is set to at least a time needed to complete one channel command to said I/O unit.

9. Data processing equipment according to claim 7, wherein the delay time of said delay circuit is set to at least a time needed to complete one channel command to said I/O unit.

10. Data processing equipment according to claim 7, wherein the monitor time of said time monitoring circuit is set to at least a time needed to complete one channel command to said I/O unit.

* * * * *